C. E. COX.
LIQUID LEVEL GAGE.
APPLICATION FILED MAR. 24, 1919.
1,375,132.
Patented Apr. 19, 1921.
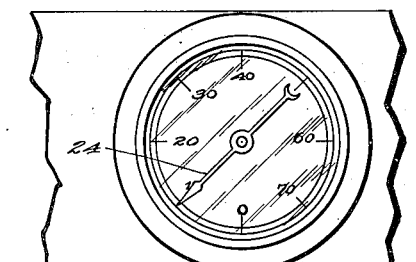
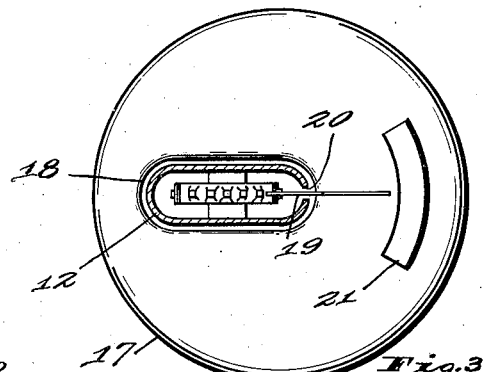
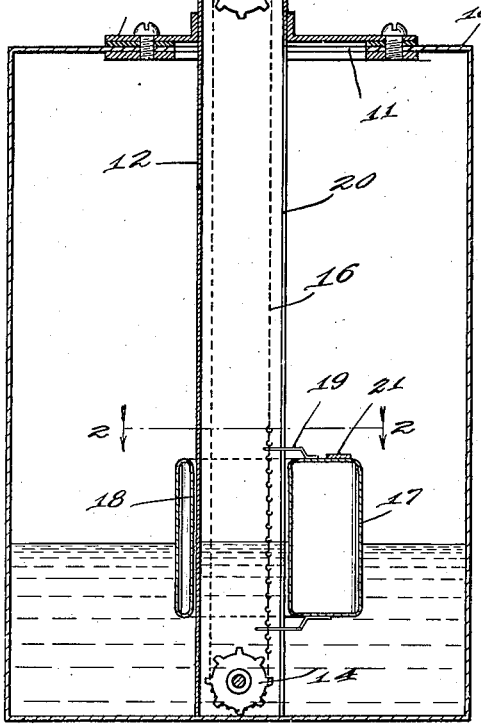
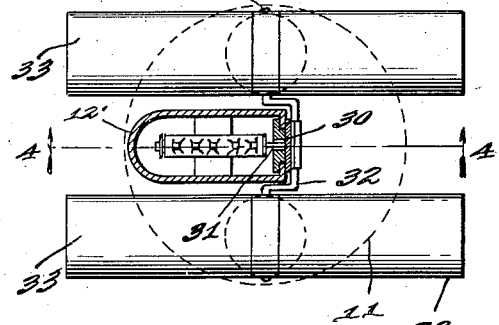
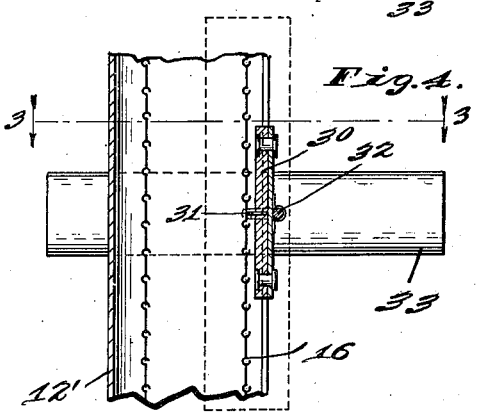
Witness
Frank A. Lahle
Inventor
Claude E. Cox,
By
Hood & Schley
Attorneys

UNITED STATES PATENT OFFICE.

CLAUDE E. COX, OF DETROIT, MICHIGAN.

LIQUID-LEVEL GAGE.

1,375,132. Specification of Letters Patent. Patented Apr. 19, 1921.

Application filed March 24, 1919. Serial No. 284,667.

*To all whom it may concern:*

Be it known that I, CLAUDE E. Cox, a citizen of the United States, residing at Detroit, in the county of Wayne and State of Michigan, have invented a new and useful Liquid-Level Gage, of which the following is a specification.

In motor vehicles dependent upon liquid fuel, especially air ships and automobiles, it is important that the driver know the available fuel supply at all times and, in most instances, it is desirable that the fuel reservoir be considerably removed from the driver.

The object of my invention is, therefore, to produce a gage, for liquid levels, of such character that varying levels may be indicated at a distant point with a minimum error.

The accompanying drawings illustrate my invention. Figure 1 is a vertical section of an embodiment of my invention; Fig. 2 a section on line 2—2 of Fig. 1; Fig. 3 a section on line 3—3 of Fig. 4, showing a modified form of float; and Fig. 4 a section on line 4—4 of Fig. 3.

In the drawings, 10 indicates a reservoir of any desired capacity, having an opening 11. A housing 12 having a length substantially equal to the depth of the reservoir (if full depths are to be indicated) is provided with a flange 13, by means of which it may be secured in place, as shown. The housing 12 supporting an idler sprocket 14 at its lower end and driving sprocket 15 at its upper end, closely confines and protects the connecting sprocket chain 16 so that any slapping of the chain will not objectionably affect the float which controls the movement of the chain.

In the form shown in Figs. 1 and 2, the housing 12 forms a guide for the float 17 and consequently said float is formed with an internal channel or passageway 18 which lies to one side of the axis of the float because the float should most desirably be centered upon the active side of chain 16, being connected thereto by arms 19 projected through a slot 20 formed through the casing 12.

Because of the force required to operate chain 16 (as will appear), float 17 must be of considerable weight and buoyancy and, when of the form shown in Figs. 1 and 2, must be of considerable depth, because in diameter it is most conveniently a trifle less than the diameter of opening 11. The float should exert a direct pull on chain 16 and the line of pull should pass through the center of flotation so that a maximum effect on the chain will be had under all conditions, and for that reason, the float should be carefully balanced, as by means of a balancing weight 21 or otherwise, in order to compensate the effect of passage 18, the parts being so proportioned that the line of the active side of chain 16 will pass through the center of buoyancy of the float. By this means all twist on the chain is eliminated and the float will normally ride free of the casing 12.

Wheel 15 is carried by a shaft 22 which is connected by suitable driving connections (such, for instance, as a flexible shaft through an air-tight tube 23) with an indicator finger 24.

The form of float shown in Figs. 1 and 2, while efficient, is sometimes objectionable, because of its relatively great depth which prevents indications of fuel depths lower than the buoyancy depth of the float. Nevertheless it is quite desirable that, while necessarily maintaining considerable weight and buoyancy in the float structure, it be readily passed through the comparatively small opening 11.

In order to satisfy the conditions, therefore, and at the same time reduce the minimum of unmeasurable fuel, I have provided the modification shown in Figs. 3 and 4.

Casing 12', which is similar to casing 12, forms a guide for a sliding head 30 connected by a finger 31 with chain 16.

Secured to head 30 are arms 32, 32 preferably alined with each other, and in the neutral plane between the head 30 and the active side of chain 16, so that there will be no tendency of the floats to either twist the chain 16 or cramp the sliding head 30 in its guides.

Pivotally mounted on arms 32, 32 are floats 33, 33 which are balanced on the plane of chain 16. These floats 33 are of such diameters that the maximum dimension from outside to outside is slightly less than the maximum diameter of opening 11 (which in the present instance is shown as round). In order to obtain sufficient weight and buoyancy, however, each float has a length considerably greater than the maximum diameter of opening 11 (as shown in Fig. 3) and it is for that reason that each float is pivoted on an arm 32, the arrangement being such that the floats may be swung to the positions indicated in dotted lines in Figs. 3 and 4 and thus be withdrawable through opening 11. Under normal operating conditions, there is no pivotal action of the floats on their supporting arms.

I claim as my invention:

A liquid gage comprising a belt, a pair of wheels supporting said belt, an elongated housing inclosing said belt and wheels and supporting said wheels at opposite ends of the housing, said housing having cross dimensions closely approximating the space occupied by the belt, a buoyant member eccentrically sleeved over the housing and connected to the belt, said buoyant member being counter-balanced, relative to the opening through which the housing passes, to balance the said member relative to the belt, means by which the housing may be attached to a reservoir, and indicating driving means connected to one of the wheels.

In witness whereof, I have hereunto set my hand at Chicago, Illinois, this 21st day of March, A. D. one thousand nine hundred and nineteen.

CLAUDE E. COX.